United States Patent
Nishiuwatoko et al.

[11] Patent Number: 6,141,513
[45] Date of Patent: Oct. 31, 2000

[54] TONER CARTRIDGE, PROCESS CARTRIDGE, AND ELECTROPHOTOGRAPHIC IMAGE FORMING APPARATUS

[75] Inventors: Tsutomu Nishiuwatoko, Tokyo; Kazuyoshi Odagawa, Koshigaya; Hiroo Kobayashi, Yokohama; Shinichi Sasaki, Fujisawa, all of Japan

[73] Assignee: Canon Kabushiki Kaisha, Japan

[21] Appl. No.: 08/867,809

[22] Filed: Jun. 3, 1997

Related U.S. Application Data

[63] Continuation of application No. 08/411,965, Mar. 28, 1995, abandoned.

[30] Foreign Application Priority Data

Mar. 30, 1994 [JP] Japan .................................. 6-061109
Mar. 2, 1995 [JP] Japan .................................. 7-043013

[51] Int. Cl.$^7$ .......................... G03G 15/00; G03G 21/18
[52] U.S. Cl. .............. 399/109; 156/94; 222/DIG. 1; 399/113; 399/119
[58] Field of Search ................................... 399/109, 111, 399/113, 119; 222/DIG. 1; 141/363, 364; 156/94, 152, 249

[56] References Cited

U.S. PATENT DOCUMENTS

| | | | |
|---|---|---|---|
| 4,708,455 | 11/1987 | Kubota et al. | |
| 5,208,634 | 5/1993 | Ikemoto et al. | 355/215 |
| 5,220,379 | 6/1993 | Fukuchi et al. | 355/200 |
| 5,223,068 | 6/1993 | Baley | 156/250 |
| 5,258,811 | 11/1993 | Miyake et al. | 355/210 |
| 5,266,998 | 11/1993 | Lee | 355/210 |
| 5,272,505 | 12/1993 | Shishido et al. | 355/219 |
| 5,294,960 | 3/1994 | Nomura et al. | 355/210 |
| 5,369,479 | 11/1994 | Tsuyuki | 355/260 |
| 5,493,366 | 2/1996 | Satoh et al. | 355/210 |

Primary Examiner—William J. Royer
Attorney, Agent, or Firm—Fitzpatrick, Cella, Harper & Scinto

[57] ABSTRACT

A process cartridge including an electrophotographic photosensitive member, a process unit for operating on the electrophotographic photosensitive member, a plurality of engaging members provided at a first frame, and a plurality of engaging members provided at a second frame. The first frame and the second frame are connected by connecting respective engaging members selected from the plurality of engaging members provided at the first frame and engaging members selected from the plurality of engaging members provided at the second frame. The process cartridge is detachably mountable in an electrophotographic image forming apparatus.

42 Claims, 13 Drawing Sheets dating a toner used in an electrophotographic image forming
TONER CARTRIDGE, PROCESS CARTRIDGE, AND ELECTROPHOTOGRAPHIC IMAGE FORMING APPARATUS This application is a continuation of prior application Ser. No. 08/411,965 filed Mar. 28, 1995, now abandoned.

BACKGROUND OF THE INVENTION

1. Field of the Invention

This invention relates to a toner cartridge for accommodating a toner used in an electrophotographic image forming apparatus such as an electrophotographic copier, an electrophotographic printer or the like, a process cartridge detachable relative to the electrophotographic image forming apparatus, and an electrophotographic image forming apparaus for forming images using the process cartridge.

2. Description of the Related Art

In the above-described electrophotographic image forming apparatus, a latent image is formed by performing selective exposure in accordance with image information on an electrophotographic photosensitive member uniformly charged by charging means. The latent image is developed into a visible image by developing means using a developer. In such an apparatus, maintenance of respective components is performed by a specialized serviceman.

Apparatuses have been practically utilized in which the photosensitive member, the charging means, the developing means, cleaning means, and the like are accommodated as one body in a housing comprising a toner receptacle, a developing frame, and a cleaning receptacle to provide a cartridge which can be loaded in the main body of the apparatus by the user. The user can replenish the developer and exchange a component, such as the photosensitive member or the like, which has reached the end of its useful life, so that maintenance is facilitated.

Recently, recycling of components of such process cartridges has started.

SUMMARY OF THE INVENTION

The present invention further develops the above-described process cartridge. The present invention may, of course, be applied not only to a process cartridge, but also to a toner cartridge for accommodating a toner and to an electrophotographic image forming apparatus.

It is an object of the present invention to provide a toner cartridge and a process cartridge whose connected components can be disassembled and easily recycled, and an electrophotographic image forming apparatus that uses such a cartridge.

It is another object of the present invention to provide a toner cartridge and a process cartridge in which toner does not leak from a receptacle after performing recycling, and an electrophotographic image forming apparatus that uses such a cartridge.

It is still another object of the present invention to provide a toner cartridge and a process cartridge in which a toner receptacle for accommodating toner is configured by a first frame and a second frame, where the first and second frames are locally connected, and an electrophotographic image forming apparatus to which the toner cartridge or the process cartridge can be applied.

According to one aspect, the present invention, which achieves these objectives, relates to a process cartridge detachable from the main body of an electrophotographic image forming apparatus, comprising an electrophotographic photosensitive member, process means for operating on the electrophotographic photosensitive member, a plurality of engaging members provided at a first frame, and a plurality of engaging members provided at a second frame. The first frame and the second frame are connected by connecting engaging members selected from the plurality of engaging members provided at the first frame and engaging members selected from the plurality of engaging members provided at the second frame.

According to another aspect, the present invention relates to a method of assembling a process cartridge detachable from the main body of an electrophotographic image forming apparatus, comprising the steps of providing an electrophotographic photosensitive member, process means for operating on the electrophotographic photosensitive member, a plurality of engaging members provided at a first frame, and a plurality of engaging members provided at a second frame, and assembling the process cartridge with the first frame and the second frame by connecting engaging members selected from the plurality of engaging members provided at the first frame and engaging members selected from the plurality of engaging members provided at the second frame.

According to still another aspect, the present invention relates to an electrophotographic image forming apparatus to which a process cartridge is detachable, for forming an image on a recording medium. The apparatus comprises an electrophotographic photosensitive member, process means for operating on the electrophotographic photosensitive member, a plurality of engaging members provided at a first frame, a plurality of engaging members provided at a second frame, mounting means for detachably mounting the process cartridge obtained by connecting the first frame and the second frame with engaging members selected from the plurality of engaging members provided at the first frame and engaging members selected from the plurality of engaging members provided at the second frame, transfer means for transferring a toner image formed on the electrophotographic photosensitive member included in the process cartridge mounted by the mounting means onto the recording medium, and conveying means for conveying the recording medium.

According to yet another aspect, the present invention relates to a toner cartridge for supplying a toner to a main body of an electrophotographic image forming apparatus, comprising a plurality of engaging members provided at a first frame, and a plurality of engaging members provided at a second frame. A toner receptacle for accommodating the toner is configured by connecting engaging members selected from the plurality of engaging members provided at the first frame and engaging members selected from the plurality of engaging members provided at the second frame.

The foregoing and other objects, advantages and features of the present invention will become more apparent from the following detailed description of the preferred embodiments taken in conjuction with the accompanying drawings.

DETAILED DESCRIPTION OF THE PREFERRED EMBODIMENTS

A detailed description will now be provided of an electrophotographic image forming apparatus, to which a process cartridge is detachable, according to an embodiment of the present invention with reference to the drawings.

First Embodiment

Figure 1:
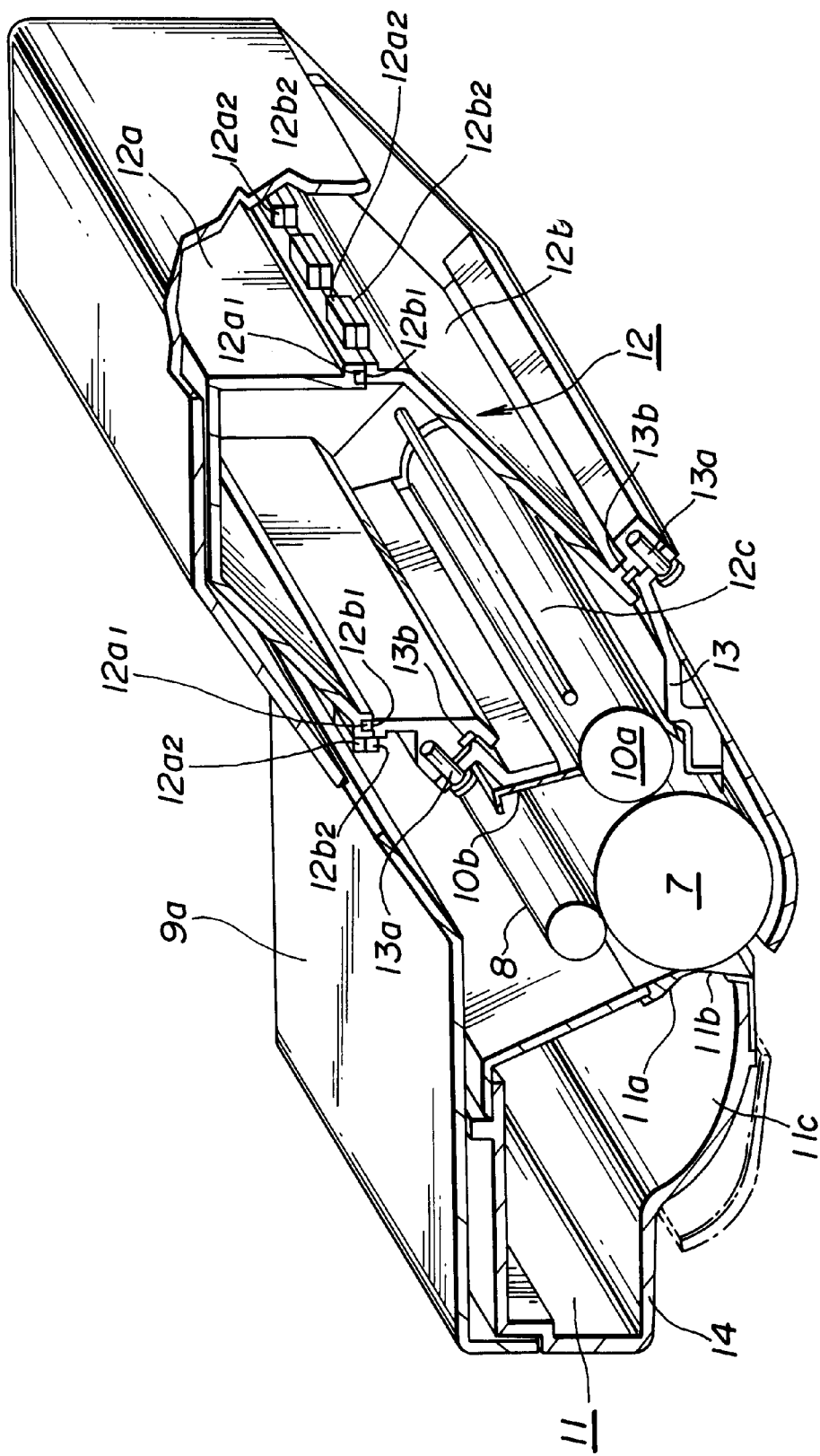
FIG. 1 is a perspective view illustrating the configuration of a process cartridge according to a first embodiment of the present invention.
Figure 2:
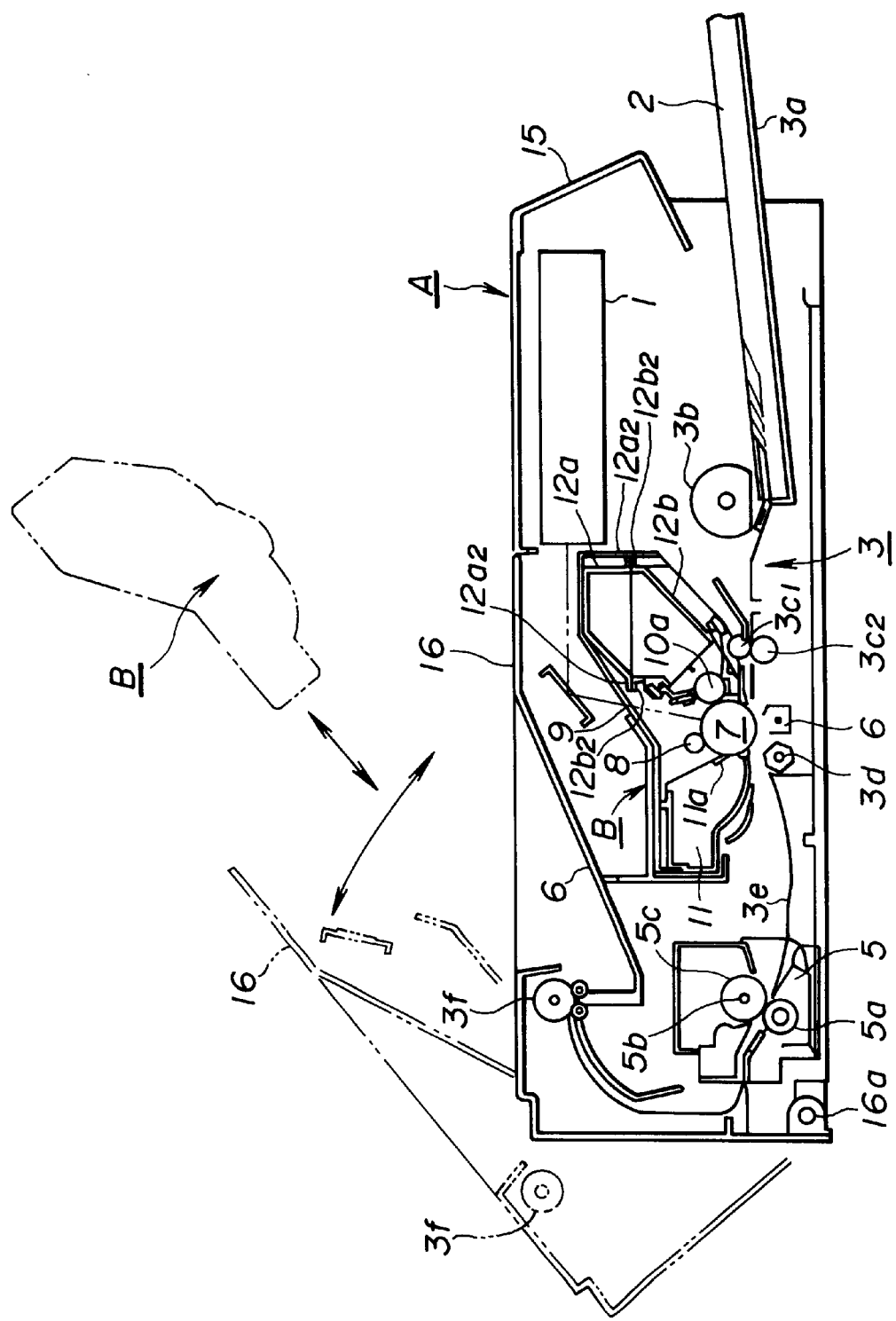
FIG. 2 is a diagram illustrating the configuration of an image forming apparatus in which the process cartridge is mounted.
Figure 3:
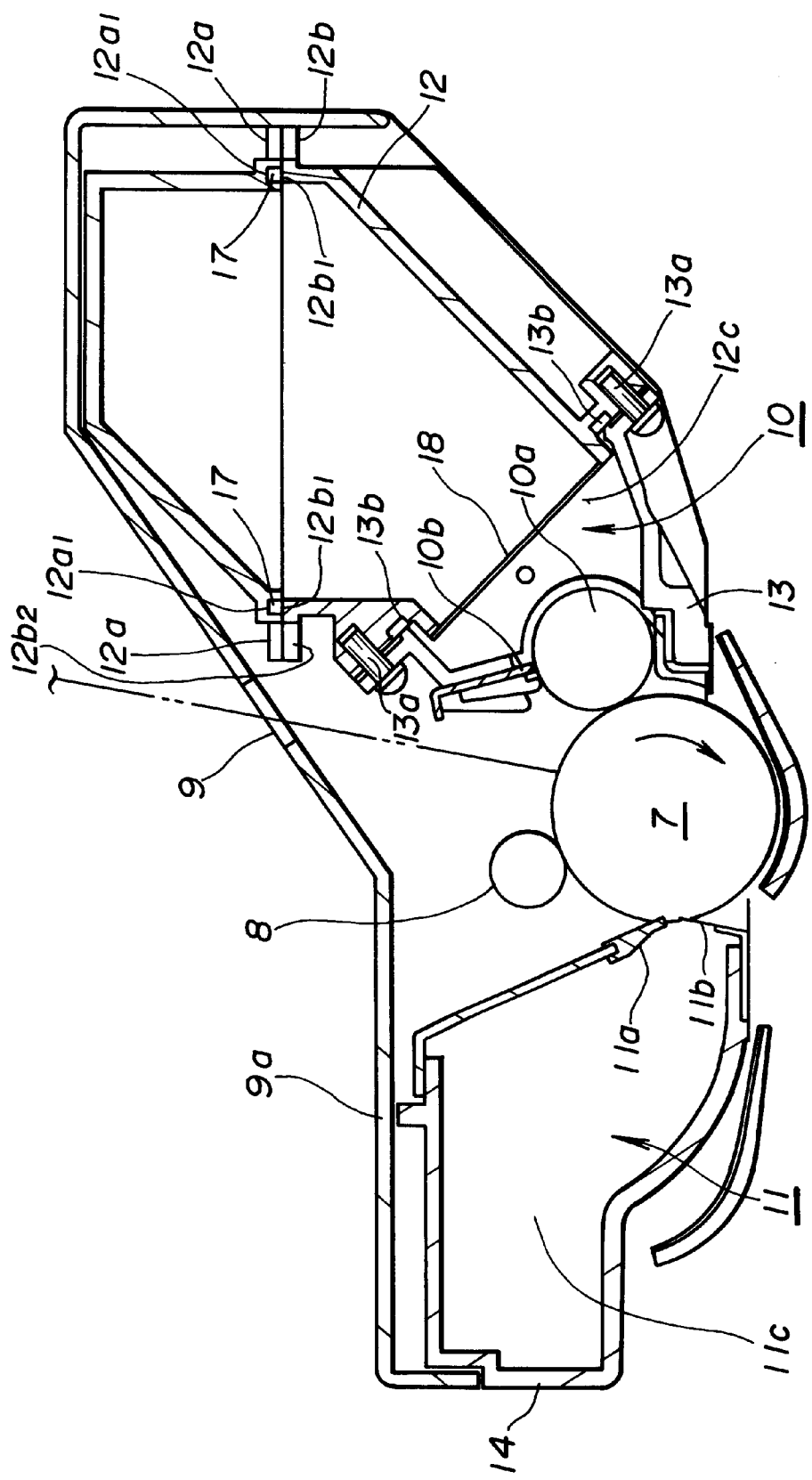
FIG. 3 is a cross-sectional view illustrating the configuration of the process cartridge.
Figure 4A:
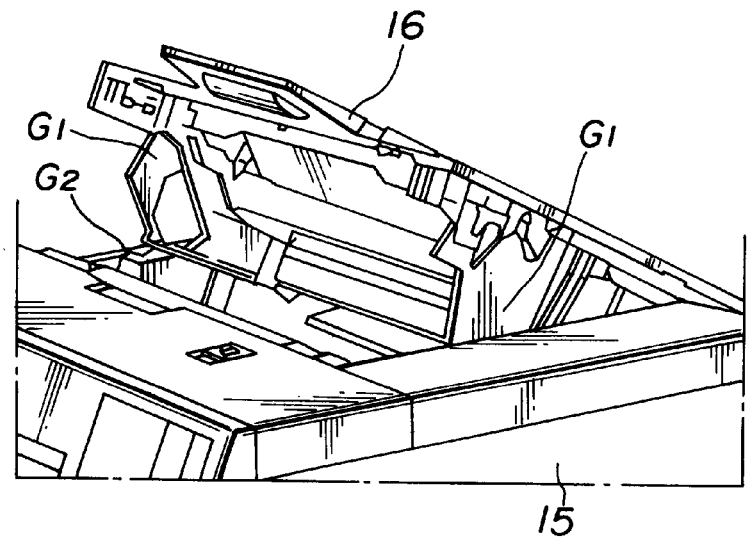
FIGS. 4(a) and 4(b) are diagrams illustrating the configuration of means for mounting the process cartridge.
Figure 4B:
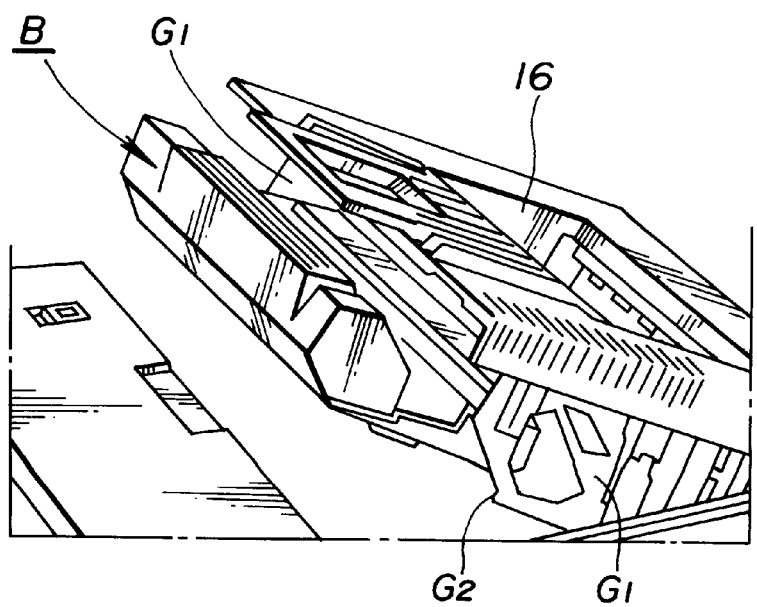
Figure 5:
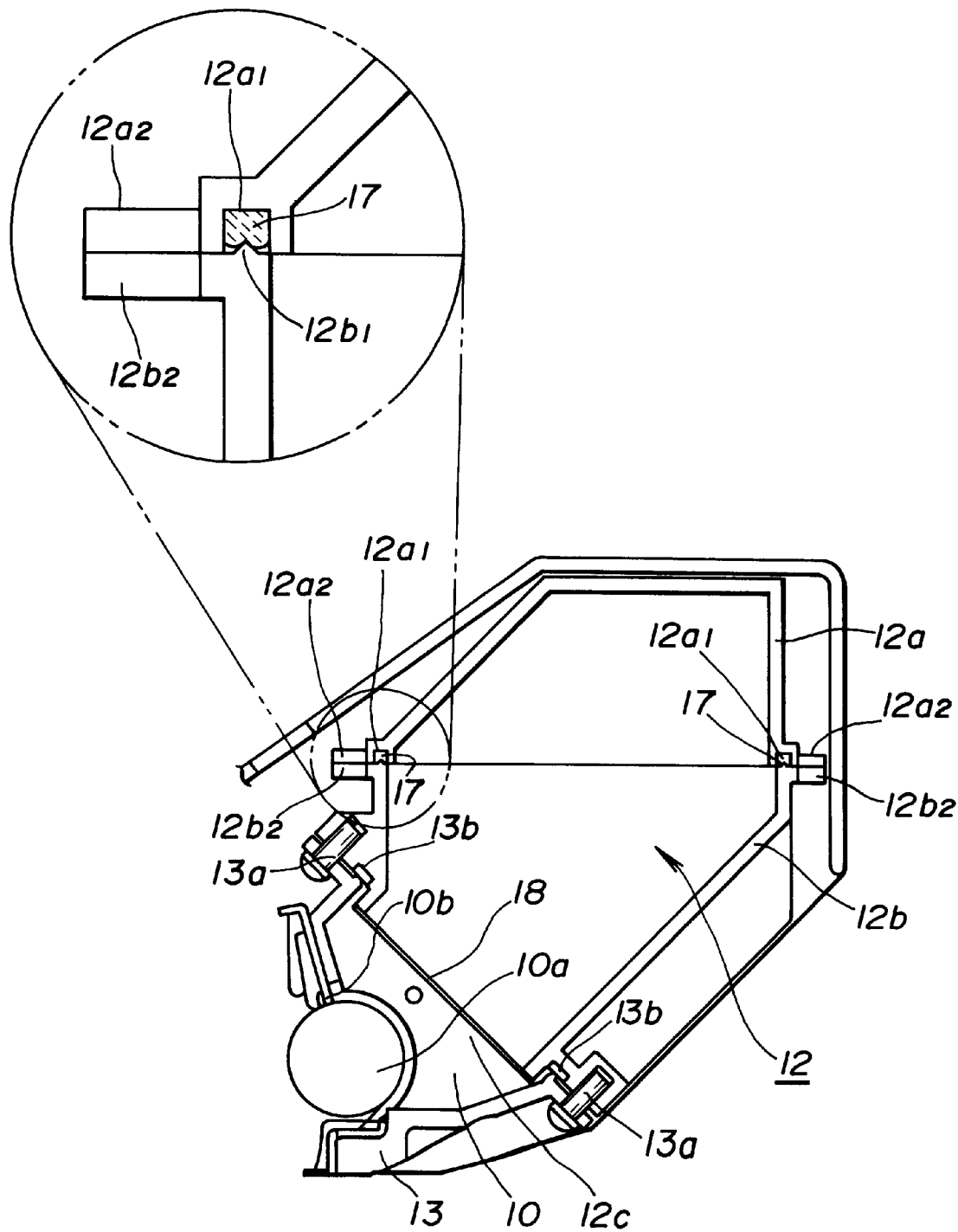
FIG. 5 is a diagram illustrating the configuration of connection of frames of a toner receptacle.

FIG. 1 is a perspective view illustrating the configuration of a process cartridge according to a first embodiment of the present invention. FIG. 2 is a diagram illustrating the configuration of an electrophotographic image forming apparatus in which the process cartridge is mounted. FIG. 3 is a diagram illustrating the configuration of the process cartridge. FIGS. 4(a) and 4(b) are diagrams illustrating the configuration of means for mounting the process cartridge. FIG. 5 is a diagram illustrating connection of frames of a toner receptacle in the process cartridge.

First, a description will be provided of the entire configuration of the electrophotographic image forming apparatus in which the process cartridge is mounted with reference to FIGS. 1 through 4(b). Thereafter, a description will be provided of the configuration of connection of the frames of the toner receptacle of the process cartridge with reference to FIGS. 1 to 3, 4(a), 4(b), and 5.

Entire Configuration

As shown in FIG. 2, in an electrophotographic image forming apparatus A, a latent image is formed on an electrophotographic photosensitive member 7 (having the shape of a drum in the present embodiment, although the shape of a belt may also be used) by projecting a laser beam onto the photosensitive member 7 in accordance with image information from an optical system 1. The latent image is developed using a toner to form a toner image. In synchronization with the formation of the toner image, a recording medium 2 is conveyed from a cassette 3a by conveying means 3, comprising a pickup roller 3b, a pair of registration rollers $3c_1$ and $3c_2$, and the like. The toner image formed on the photosensitive member 7 then is transferred onto the recording medium 2 by applying a voltage to a transfer charger 4, serving as transfer means. Thereafter, the recording medium 2 is conveyed to fixing means 5 by an intermediate discharging roller 3d and a guide plate 3e. The fixing means 5 comprises a driving roller 5a and a fixing roller 5c incorporating a heater 5b, and fixes the transferred toner image by applying heat and pressure to the recording medium 2 which passes through the fixing means 5. The recording medium 2 is conveyed by a set of discharging rollers 3f, and is discharged onto a discharging unit 6 after passing through a reversal conveying path.

A process cartridge B is detachably mountable in the electrophotographic image forming apparatus A. As shown in FIGS. 1 and 3, the photosensitive drum 7 having a photosensitive layer is rotated, and the surface of the photosensitive drum 7 is uniformly charged by applying a voltage to a charging roller 8, serving as charging means. The laser beam corresponding to the image information from the optical system 1 exposes the photosensitive drum 7 via an exposure aperture 9 provided in a cartridge cover 9a to form the latent image, which is developed by developing means 10. In the developing means 10, toner within the toner receptable 12 is fed by a toner-feeding member (not shown), a developing sleeve 10a incorporating a fixed magnet is rotated, and a toner layer, to which electric charges produced by triboelectrification are provided by a developing blade 10b, is formed on the surface of the developing sleeve 10a. The toner image is formed by transferring toner particles onto the photosensitive drum 7 in accordance with the latent image. After transferring the toner image onto the recording medium 2 by applying a voltage having a polarity opposite to that of the toner image to the transfer charger 4, toner particles remaining on the photosensitive drum 7 are scraped off by a cleaning blade 11a. The removed toner particles are scooped by a scooping sheet 11b, and are gathered in a waste-toner reservoir 11c. Thus, toner particles remaining on the photosensitive drum 7 are removed by cleaning means 11.

The above-described respective units, such as the photosensitive drum 7 and the like, are accommodated within a housing which includes the toner receptacle 12 for accommodating the toner, a developing frame 13 holding developing members, such as the developing sleeve 10a, the developing blade 10b and the like, and a cleaning receptacle 14 holding the cleaning blade 11a, and including the waste-toner reservoir 11c and the like, to constitute a process cartridge B. The process cartridge B is detachably mountable in cartridge mounting means provided in a main body 15 of the apparatus.

As shown in FIG. 2, the cartridge mounting means is mounted in the main body 15 of the apparatus in such a manner that an opening/closing member 16 is openable/closable around a shaft 16a relative to the main body 15 of the apparatus. As shown in FIGS. 4(a) and 4(b), when the opening/closing member 16 is opened, cartridge mounting guide members G1 are provided at two inner sides of the opening/closing member 16, and guide members G2 for inserting the process cartridge B are also provided so as to face the guide members G1. By inserting the process cartridge B along the guide members G2 and closing the opening/closing member 16, the process cartridge B is mounted in the image forming apparatus A.

The Configuration of Connection of the Toner Receptacle

As shown in FIGS. 1 and 5, the toner receptacle 12 comprises a first receptacle frame 12a, and a second receptacle frame 12b which can be connected thereto. A description will now be provided of the frames 12a and 12b.

A seal-material groove $12a_1$ is provided in each of the connecting surfaces of the first receptacle frame 12a connected to the second receptacle frame 12b. An elastic seal member (for example, an elastic sponge or the like) 17 is fitted in the groove $12a_1$. A pressing rib $12b_1$ for pressing the elastic seal member 17 when connected to the first receptacle frame 12a is provided on each of the connecting surfaces of the second receptacle frame 12b connected to the first receptacle frame 12a. A plurality of fixing tabs $12a_2$ and $12b_2$ are provided at the connecting surfaces of the first receptacle frame 12a and the second receptacle frame 12b, respectively, along the outer circumferences at two sides of the respective frames in the longitudinal direction at a certain interval so as to face each other.

Accordingly, by connecting the first receptacle frame 12a and the second receptacle frame 12b and selectively fixing some pairs of the plurality of fixing tabs $12a_2$ and $12b_2$ after fitting the seal members 17 in the respective grooves $12a_1$ provided at two sides of the frame 12a, the frames 12a and 12b can be connected, and the connected surfaces can be sealed by seal members 17. The fixing tabs $12a_2$ and $12b_2$ used in an operation of connecting the frames 12a and 12b may be appropriately selected. For example, every other tab or every two tabs may be selected, in consideration of the connecting strength.

As shown in the enlarged view of FIG. 5, in this sealing operation, the pressing rib $12b_1$ secures the seal by engaging the seal member 17, so that toner is prevented from leaking from the connecting surfaces between the frames 12a and 12b. The pressing ribs $12b_1$ are not necessarily provided. Furthermore, a sponge or the like may, for example, be provided in the connecting surface between the frames 12a and 12b.

It is preferable to fix the fixing tabs $12a_2$ and $12b_2$ by ultrasonic welding or heat sealing for ease of fixing and for obtaining a desirable fixing force, but they may, for example, be bonded using an adhesive.

The developing frame 13 is connected to the toner receptacle 12 assembled in the above-described manner using screws or welding. The process cartridge B is assembled by mounting the developing sleeve 10a, the developing blade 10b, the photosensitive drum 7, the charging roller 8 and the cleaning receptacle 14 in the developing frame 13. In the present embodiment, in order to facilitate a disassembling operation, the developing frame 13 is mounted to the toner receptacle 12 using screws 13a. Reference numeral 13b represents elastic seals for preventing toner particles from leaking from connecting surfaces between the receptacle 12 and the frame 13.

An opening (not shown) for supplying the toner is provided at one side of the toner receptacle 12. After supplying the toner from this opening, the opening is closed by a cap. The toner is supplied after mounting a sealing film 18 (to be described later).

An opening 12c for supplying the toner within the toner receptacle 12 to the developing sleeve 10a is provided at a lower portion of the second receptacle frame 12b connected to the developing frame 13. After supplying the toner into the receptacle 12, the opening 12c is closed by the sealing film 18 (see FIG. 5) while the process cartridge B is not used. When starting to use the process cartridge B, the operator peels back the sealing film 18 to supply the toner within the toner receptacle 12a to the developing sleeve 10a. The sealing film 18 is fixed to the frame 12b by heat sealing or using an adhesive. One end of the sealing film 18 in the longitudinal direction protrudes from the process cartridge B. Before using the process cartridge B, the operator pulls the protruding portion of the sealing film 18, whereby the sealing film 18 peels off from the frame 12b to open the opening 12c.

After the process cartridge B has been used up, it is collected and recycled. In a recycling process, the toner receptacle 12 of the present embodiment can be disassembled into the first receptacle frame 12a and the second receptacle frame 12b by cutting the welded fixing tabs $12a_2$ and $12b_2$ using a cutter or the like.

After the disassembling operation, the frames 12a and 12b are subjected to processing, such as cleaning and the like, and are again connected. At that time, the frames 12a and 12b can be easily connected by selectively welding unused fixing tabs from among the plurality of fixing tabs $12a_2$ and $12b_2$.

Since the seal member 17 has been fitted in the seal groove $12a_1$ without using an adhesive, it can be easily exchanged after being peeled from the seal groove $12a_1$. Accordingly, even when the toner receptacle 12 has been repeatedly used exceeding the limit of reusage and therefore must be discarded, the seal member 17 can be easily removed reused.

If the total number of the pairs of fixing tabs $12a_2$ and $12b_2$ and the number of pairs of fixing tabs $12a_2$ and $12b_2$ used for connecting the frames 12a and 12b are previously determined, the number of recycling operations can be easily known, so that it is possible to prevent the toner receptacle 12 from being used exceeding the limit of reusage.

First Modification of the First Embodiment

Figure 6:
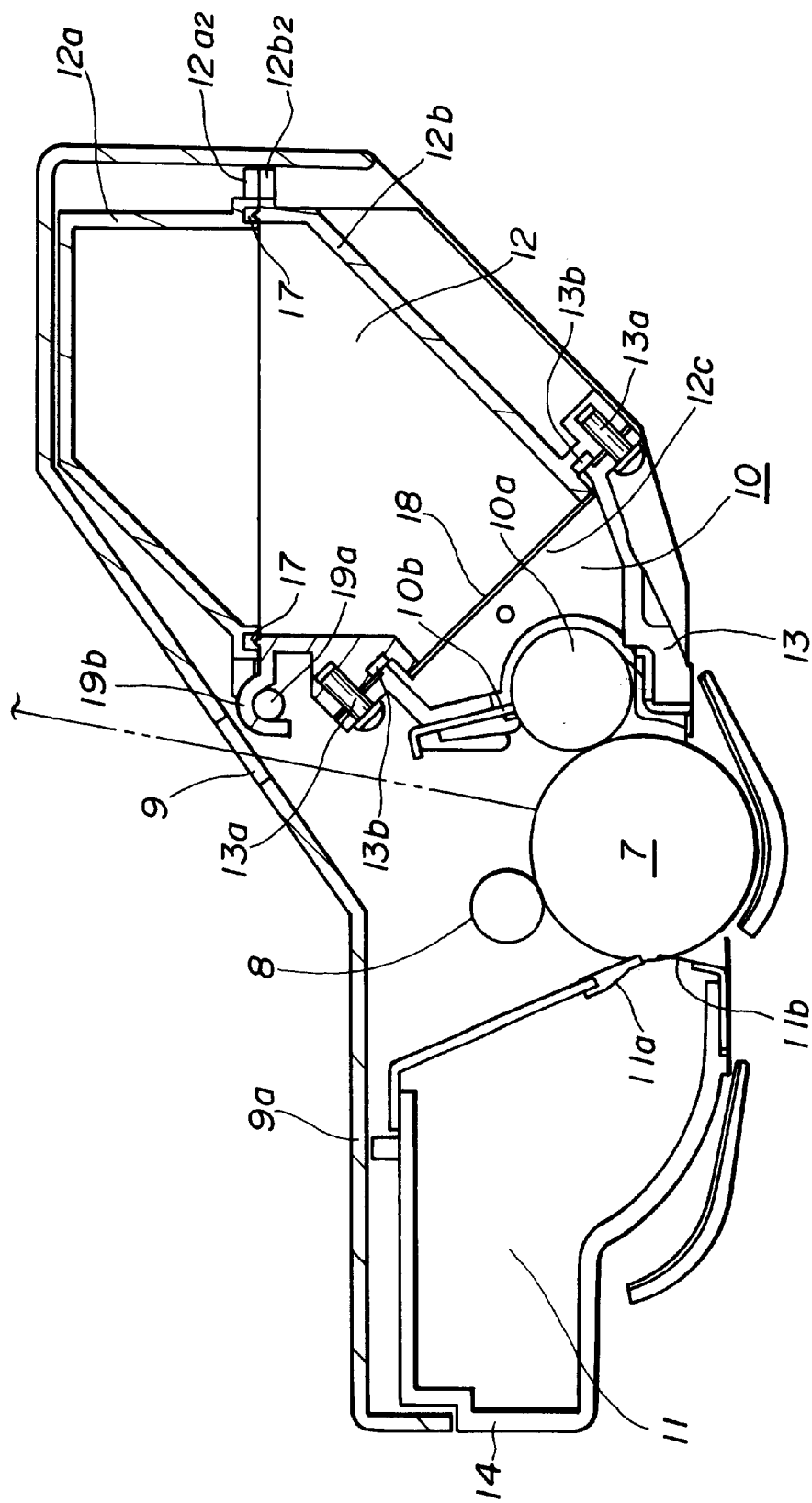
FIG. 6 is a diagram illustrating the configuration of a process cartridge according to a first modification of the first embodiment.
Figure 7:
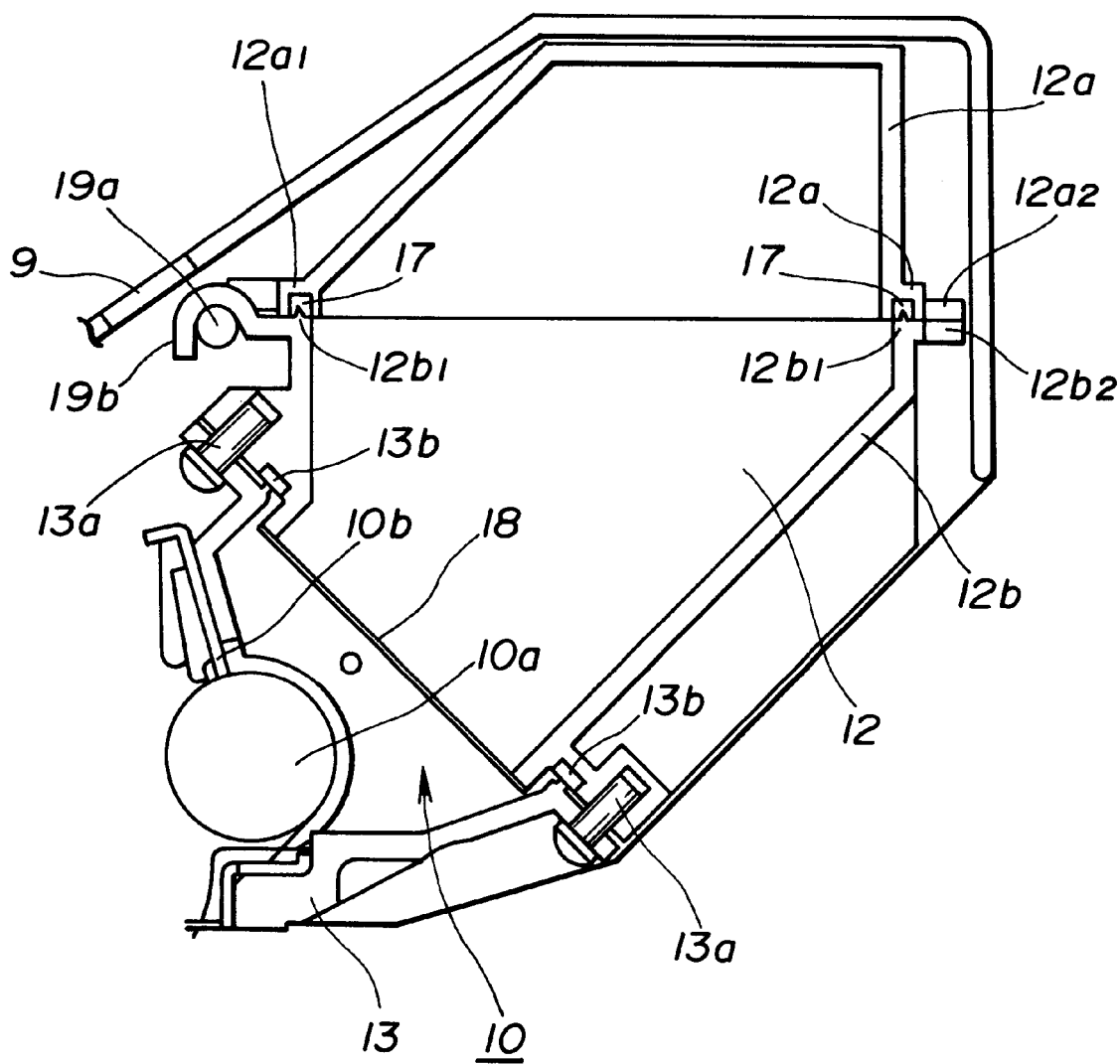
FIG. 7 is an enlarged view illustrating connected portions shown in FIG. 6.

In the above-described first embodiment, the fixing tabs $12a_2$ and $12b_2$ are provided at two sides of the connecting surfaces of the first receptacle frame 12a and the second receptacle frame 12b as means for connecting the first receptacle frame 12a and the second receptacle frame 12b, respectively. However, for example, the configuration shown in FIGS. 6 and 7 may be adopted. In FIGS. 6 and 7, in order to facilitate the description, components having the same functions as those shown in the first embodiment are indicated by the same reference numerals.

In this modification, a plurality of pairs of fixing tabs $12a_2$ and $12b_2$ having the same configuration as in the first embodiment are provided only at one side of each of the connecting portions of the first receptacle frame 12a and the second receptacle frame 12b in the longitudinal direction, respectively. The other side of each of the connecting portions of the first receptacle frame 12a and the second receptacle frame 12b has a hinge structure comprising a hinge arm portion 19a and a hinge holder 19b. In this modification, the hinge arm portion 19a is provided at the frame 12a and the hinge holder 19b is provided at the frame 12b.

In such a configuration, the frames 12a and 12b can be connected by engaging the hinge arm portion 19a with the hinge holder 19b and then selectively welding some of the plurality of pairs of fixing tabs $12a_2$ and $12b_2$. According to this configuration, when recycling the toner receptacle 12, the same effects as those in the first embodiment can be obtained. Moreover, since the number of pairs of fixing tabs which have been welded is half the number in the first embodiment, the time required for removing fixing tabs when disassembling the frames 12a and 12b can be reduced.

Second Modification of the First Embodiment

Figure 8:
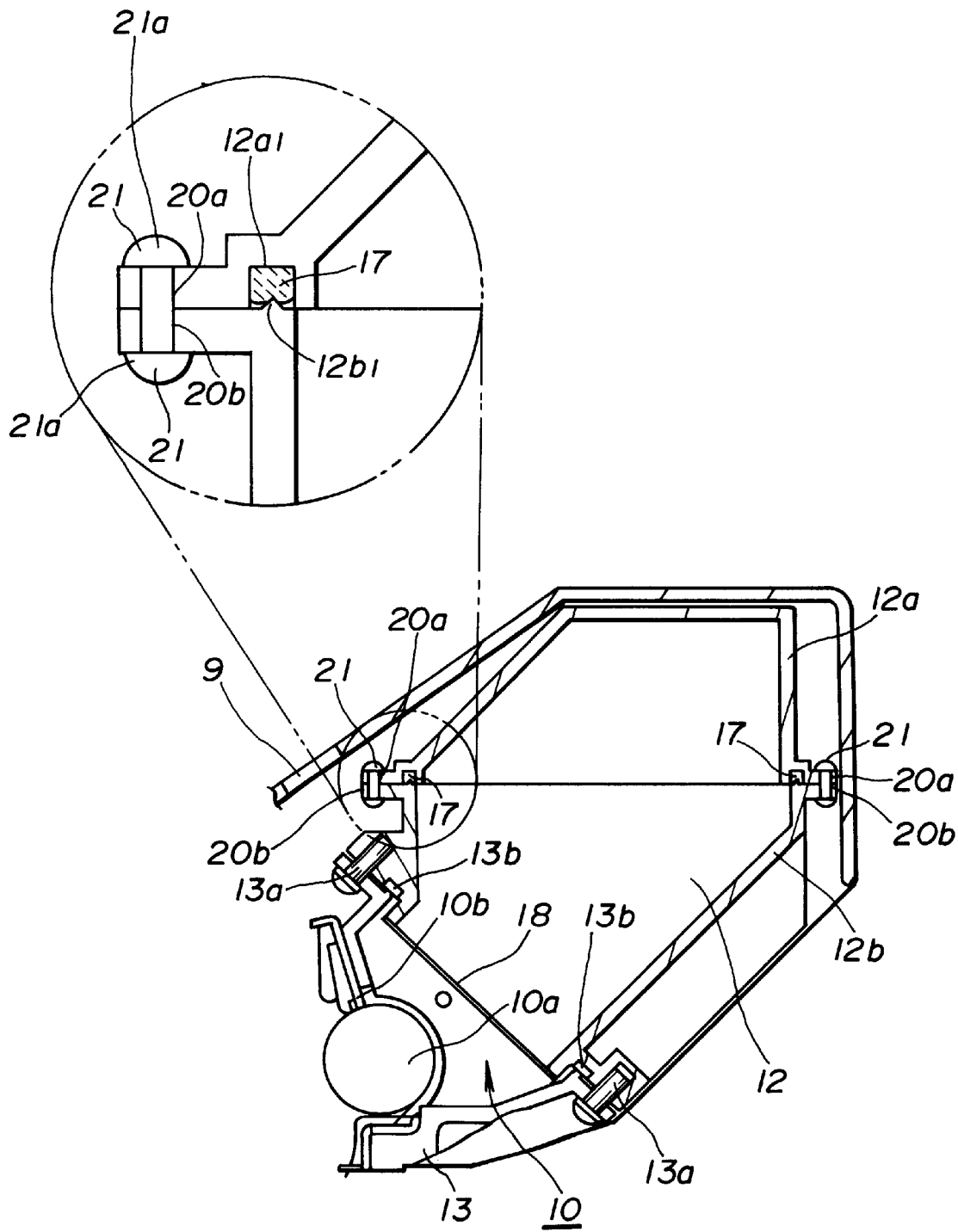
FIG. 8 is a diagram illustrating a toner receptable of a process cartridge according to a second modification of the first embodiment.
Figure 9:
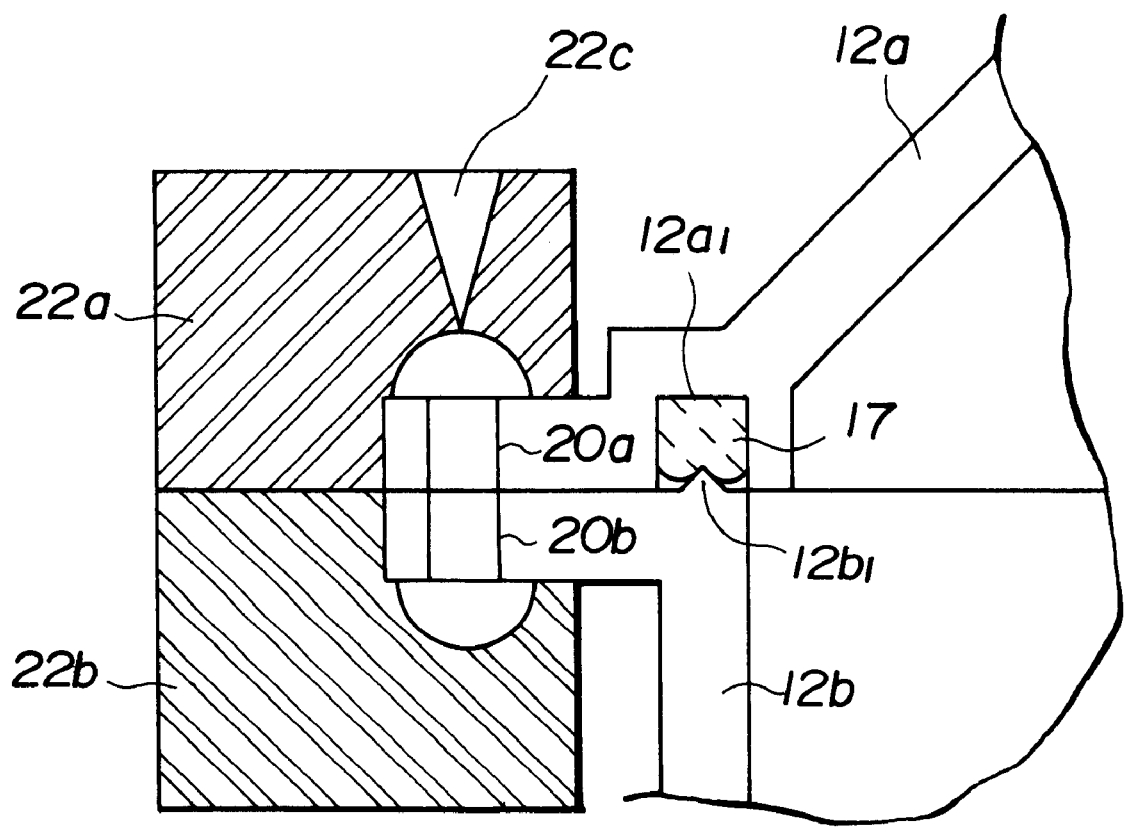
FIG. 9 is a diagram illustrating a tool for forming an injected hinge lock member for connecting the frame of a first receptacle and the frame of a second receptacle.

The configuration shown in FIGS. 8 and 9 may be adoped as a second modification of the first embodiment. Also in this case, in order to facilitate the description, components having the same functions as those shown in the first embodiment are indicated by the same reference numerals.

As shown in FIG. 8, in this modification, a plurality of pairs of threaded holes 20a and 20b are provided in a line in two sides of the connecting portions of the first receptacle frame 12a and the second receptacle frame 12b in the longitudinal direction. When connecting the frames 12a and 12b, injected hinge lock members 21 are formed by pouring a resin in threaded holes 20a and 20b selected from the plurality of pairs of threaded holes 20a and 20b. Each of the hinge lock members 21 having head portions 21a are formed by pouring the resin from an inlet 22c shown in FIG. 9 using hinge-lock forming tools 22a and 22b. The first receptacle frame 12a and the second receptacle frame 12b can be connected by the hinge lock members 21.

In the above-described configuration, if the melting point of an injected material constituting the hinge lock members 21 is sufficiently low, no chemical influences are given to the toner receptacle 12 and the toner. Hence, when recycling the toner receptacle 12, the frames 12a and 12b can be disassembled by cutting the injected hinge lock members 21. The frames 12a and 12b can be connected again by forming injected hinge lock members 21 by injecting the resin in threaded holes 20a and 20b which have not been selected.

Also in this modification, the injected hinge lock members 21 may not be provided at two sides of the connecting surfaces of the frames 12a and 12b in the longitudinal direction. For example, as shown in FIG. 7, the hinge structure comprising the hinge arm portion 19a and the hinge holder 19b may be provided only in one side of the connecting surfaces of the frames 12a and 12b in the longitudinal direction, and the pair of threaded holes 20a and 20b may be provided at the one side of the connecting surfaces of the frames 12a and 12b in the longitudinal direction. The frames 12a and 12b then may be connected by forming the injected hinge lock members 21 by injecting the resin in the pair of threaded holes 20a and 20b.

Second Embodiment

In the above-described first embodiment, the toner receptacle 12 is comprised of the first receptacle frame 12a and the second receptacle frame 12b, which are connected so as to be disassemblable. A description will now be provided of a configuration of a process cartridge according to a second embodiment of the present invention, in which a toner receptacle and a developing frame are connected so as to be disassemblable, with reference to FIGS. 10(a) through 13(c). The basic configuration of the process cartridge B of this embodiment is the same as the process cartridge B of the first embodiment. Hence, in order to facilitate the description, components having the same functions as those shown in the first embodiment are indicated by the same reference numerals.

The process cartridge B of the second embodiment differs from that of the first embodiment in that the toner receptacle 12 cannot be disassembled, but the toner receptacle 12 and the developing frame 13 can be disassembled from each other in a recycling operation.

Figure 10A:
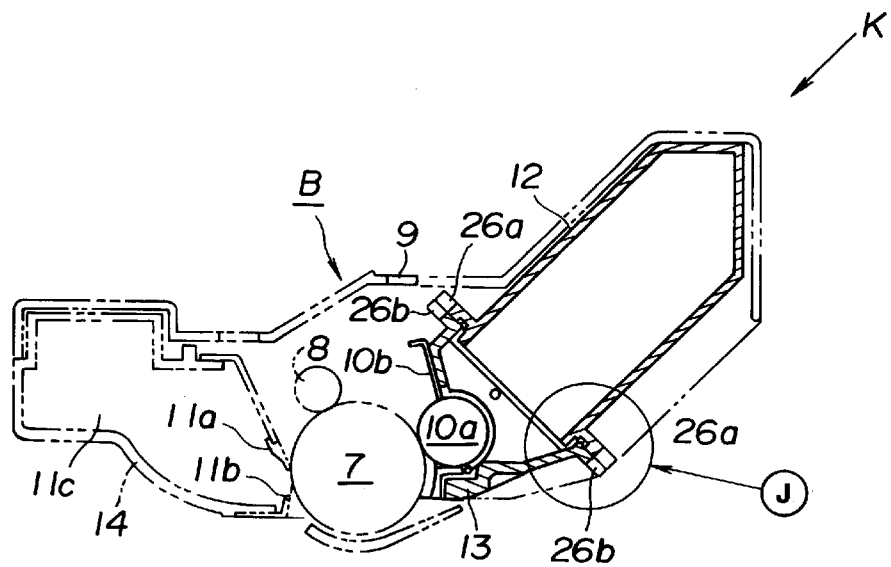
FIG. 10(a) is a diagram illustrating the configuration of a process cartridge according to a second embodiment of the present invention.
Figure 10B:
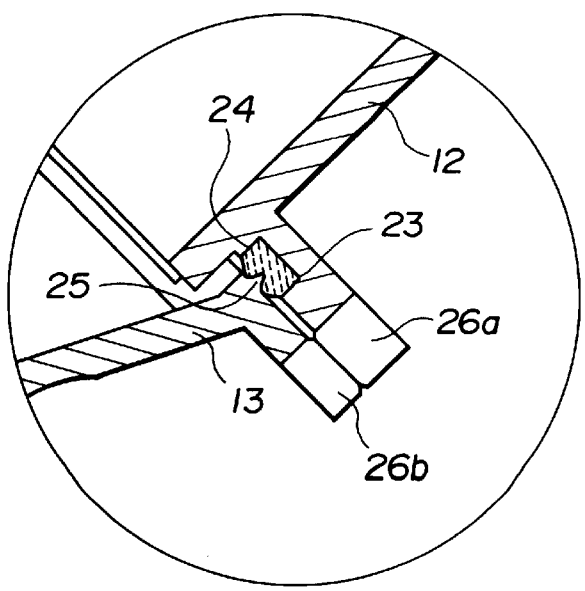
FIG. 10(b) is an enlarged view illustrating a portion J shown in FIG. 10(a)
Figure 10C:
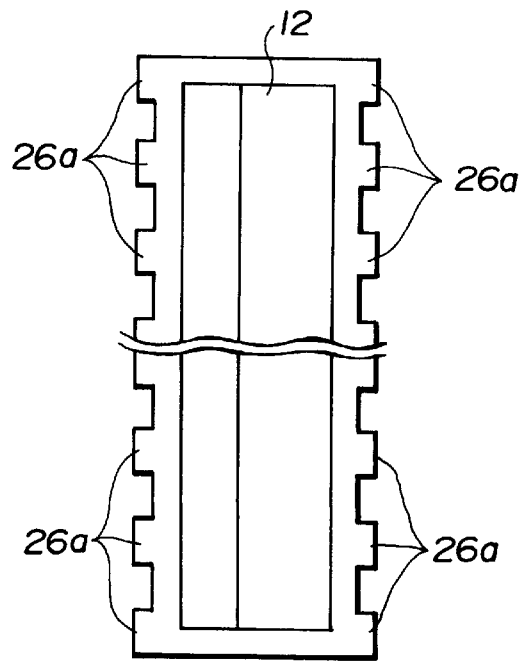
FIG. 10(c) is a diagram as seen from an arrow K shown in FIG. 10(a)

A description will now be provided of the configuration of connection between the toner receptacle 12 and the developing frame 13 with reference to FIGS. 10(a) through 10(c). FIG. 10(a) is a diagram illustrating the configuration of developing means of the process cartridge B. FIG. 10(b) is an enlarged view illustrating a portion J shown in FIG. 10(a). and FIG. 10(c) is a diagram as seen from an arrow K shown in FIG. 10(a).

The configuration of connection between the toner receptacle 12 and the developing frame 13 is the same as the above-described configuration of connection between the first receptacle frame and the second receptacle frame. As shown in FIGS. 10(a) and 10(b), a seal-material groove 23 is provided in each of the surfaces of the toner receptacle 12 connected to the developing frame 13. An elastic seal member 24 is fitted in the groove 23. A pressing rib 25 for pressing the elastic seal member 24 when connected to the toner receptacle 12 is provided on each of the surfaces of the developing frame 13 connected to the toner receptacle 12. As shown in FIG. 10(c), a plurality of fixing tabs 26a and 26b are provided at the connecting surfaces of the toner receptacle 12 and the developing frame 13 along the outer circumferences at two sides of the toner receptacle 12 and the developing frame 13, respectively, in the longitudinal direction so as to face each other.

Accordingly, by connecting the toner receptacle 12 and the developing frame 13 and selectively fixing selected pairs of the plurality of fixing tabs 26a and 26b, the toner receptacle 12 and the developing frame 13 can be connected, and the connected surfaces can be sealed by the seal members 24.

In this sealing operation, the pressing rib 25 secures the sealability by engaging the seal member 24, as in the first embodiment. The fixing tabs 26a and 26b are connected in the same manner as in the first embodiment.

The process cartridge B is assembled by mounting the developing sleeve 10a, the developing blade 10b, the photosensitive drum 7, the charging roller 8 and the cleaning receptacle 14 in the developing frame 13 connected to the toner receptacle 12.

After the process cartridge B has been used up, it is collected and recycled. In a recycling process, the toner receptacle 12 and the developing frame 13 of the present embodiment can be easily disassembled by cutting the welded fixing tabs 26a and 26b. After the disassembling operation, the toner receptacle 12 and the developing frame 13 are subjected to processing, such as cleaning and the like, and are again connected. At that time, the toner receptacle 12 and the developing frame 13 can be easily connected again by selectively welding unused fixing tabs from among the plurality of fixing tabs 26a and 26b.

In the above-described configuration, the seal member 24 can be easily exchanged after being peeled off. If the total number of pairs of fixing tabs 26a and 26b and the number of pairs of fixing tabs 26a and 26b used for connecting the toner receptacle 12 and the developing frame 13 are previously determined, the number of recycling operations can be easily determined, so that it is possible to prevent the toner receptacle 12 from being used a number of times exceeding the limit of reusage, as in the first embodiment.

First Modification of the Second Embodiment

Figure 11A:
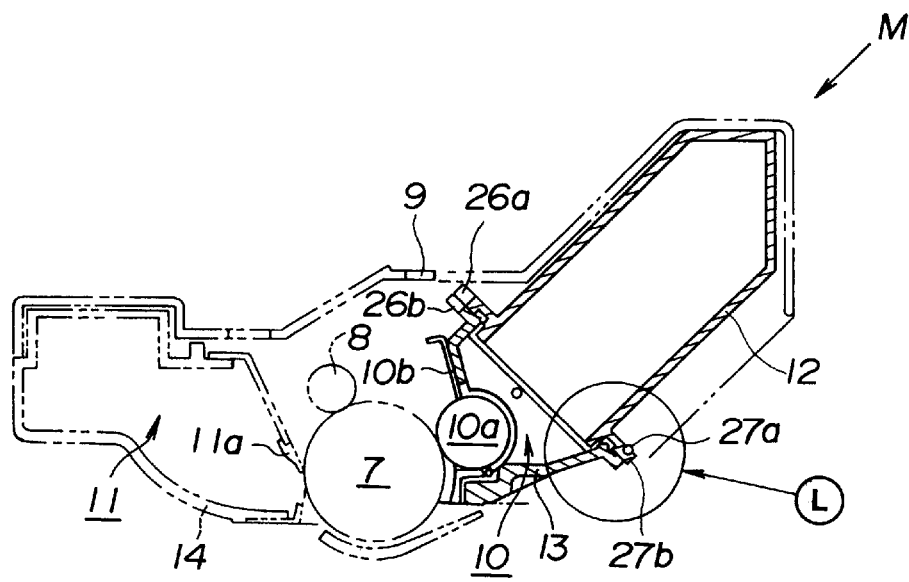
FIG. 11(a) is a diagram illustrating the configuration of a process cartridge according to a first modification of the second embodiment.
Figure 11B:
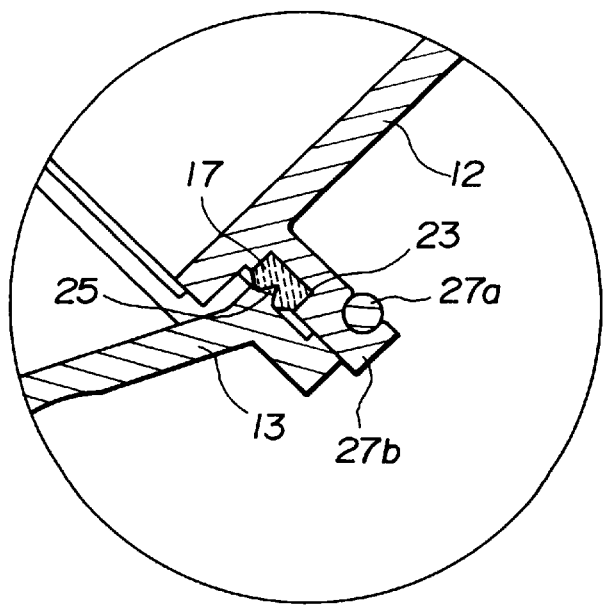
FIG. 11(b) is an enlarged view illustrating a portion L shown in FIG. 11(a)
Figure 11C:
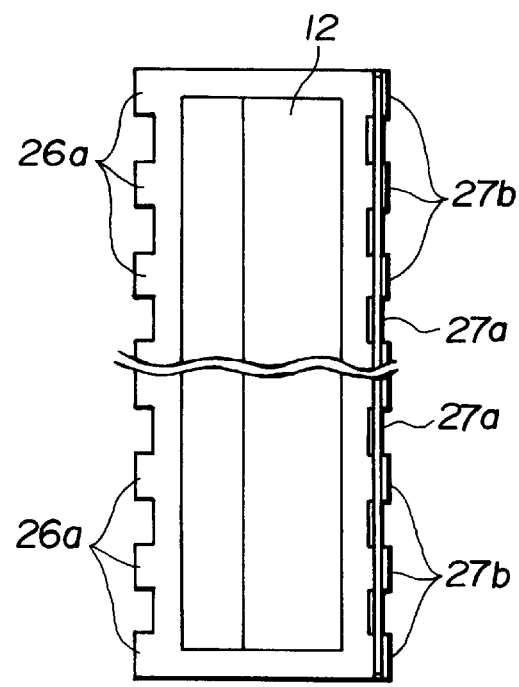
FIG. 11(c) is a diagram as seen from an arrow M shown in FIG. 11(a)

As another configuration of the above-described means for connecting the toner receptacle 12 and the developing frame 13, as in the case of the first modification of the first embodiment, as shown in FIGS. 11(a) through 11(c), a plurality of pairs of fixing tabs 26a and 26b having the same configuration as in the second embodiment are provided only at one side of each of the connecting portions of the toner receptacle 12 and the developing frame 13 in the longitudinal direction, respectively. A hinge structure comprising a hinge arm portion 27a provided at the developing frame 13 and a hinge holder 27b provided at the toner receptacle 12 may be adopted at the other side.

According to this configuration, when recycling the toner receptacle 12 and the developing frame 13, the same effects as those in the second embodiment can be obtained. Moreover, since the number of pairs of fixing tabs which have been welded is half the number in the second embodiment, the time required for removing fixing tabs when disassembling the toner receptacle 12 and the developing frame 13 can be reduced.

Second Modification of the Second Embodiment

Figure 12A:
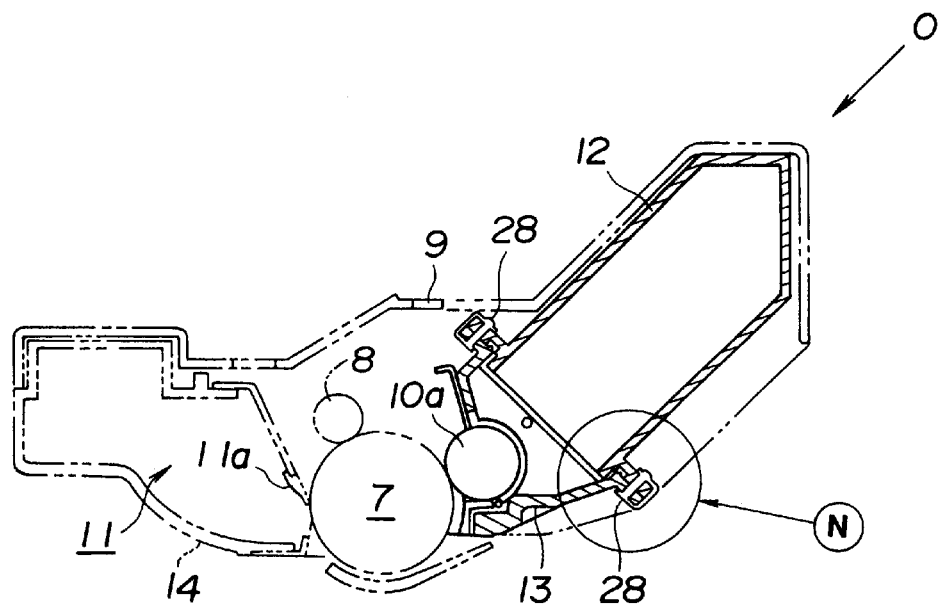
FIG. 12(a) is a diagram illustrating the configuration of a process cartridge according to a second modification of the second embodiment.
Figure 12B:
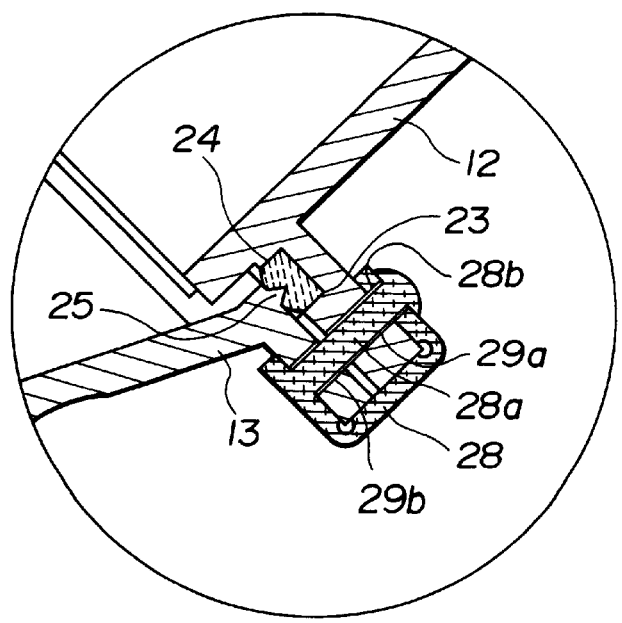
FIG. 12(b) is an enlarged view illustrating a portion N shown in FIG. 12(a)
Figure 12C:
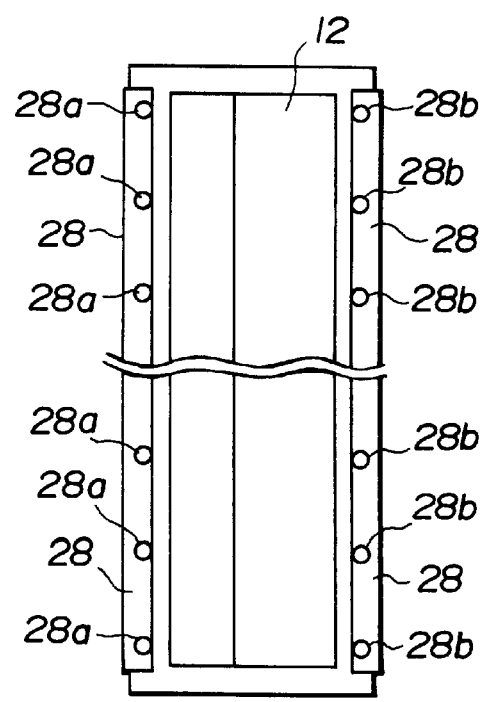
FIG. 12(c) is a diagram as seen from an arrow O shown in FIG. 12(a)

As another configuration of the means for connecting the toner receptacle 12 and the developing frame 13, as shown in FIGS. 12(a) through 12(c), hinge lock members 28 may be used.

In this configuration, a plurality of pairs of threaded holes 29a and 29b are provided in two sides of the connecting portions between the toner receptacle 12 and the developing frame 13 in the longitudinal direction. Each of the hinge lock members 28 can be folded in a C-like shape covering the end of the corresponding connecting portion, and has pins 28a threading through the threaded holes 29a and 29b, and holes 28b through which the pins 28a can be inserted.

By threading the pins 28a of the hinge lock members 28 through the corresponding threaded holes 29a and 29b of the toner receptacle 12 and the developing frame 13, and the corresponding holes 28b, and by deforming the distal ends of the pins 28a protruding from the holes 28b by plastic deformation, thermal deformation or the like, the toner receptacle 12 and the developing frame 13 can be connected. In an operation for connecting the toner receptacle 12 and the developing frame 13, only selected pins 28a may be deformed. According to this approach, in a recycling operation, the toner receptacle 12 and the developing frame 13 can be connected again by deforming pins which have not been selected in a preceding connection operation.

According to this configuration, in a recycling operation, the toner receptacle 12 and the developing frame 13 can be disassembled by cutting off the deformed head portions of the pins 28. Since no chemical influences are given to the toner receptacle 12 and the developing frame 13 when mounting the hinge lock members 28, the toner receptacle 12 and the developing frame 13 can be connected again by simply using new hinge lock members 28 in a recycling operation.

Although in this modification, as shown in FIG. 12(c), each of the hinge lock members 28 covers the entire longitudinal direction of the connecting portion, a plurality of hinge lock members provided for respective pairs of threaded holes 29a and 29b may also be used.

Also in this modification, the hinge lock members 21 need not be provided at two sides of the connecting surfaces of the toner recpetacle 12 and the developing frame 13 in the longitudinal direction. For example, as shown in FIGS. 11(a) through 11(c), the hinge structure comprising the hinge arm portion and the hinge holder may be provided at only one side of the connecting surfaces of the toner receptacle 12 and the developing frame 13 in the longitudinal direction, and the pairs of threaded holes may be provided at the one side of the connecting surfaces of the toner receptacle 12 and the developing frame 13 in the longitudinal direction. The toner receptacle 12 and the developing frame 13 then may be connected by mounting the hinge lock member 28.

Third Modification of the Second Embodiment

As in the modification shown in FIG. 8, the above-described hinge lock member may comprise an injected hinge lock member formed by injecting a resin.

Figure 13A:
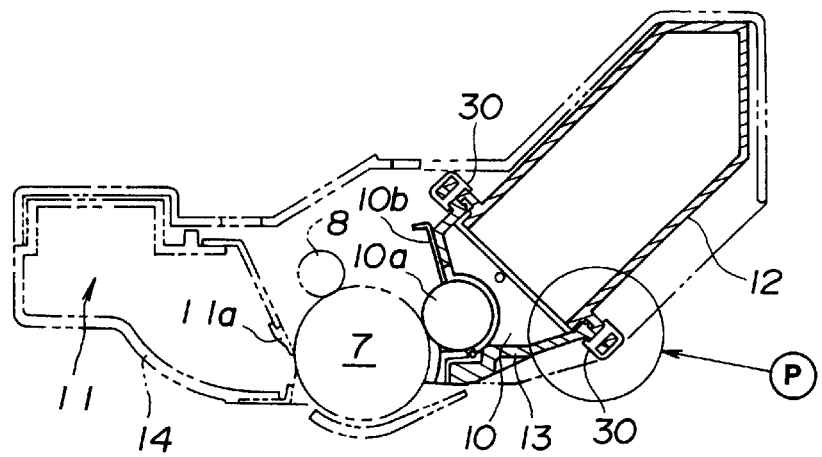
FIG. 13(a) is a diagram illustrating the configuration of a process cartridge according to a third modification of the second embodiment.
Figure 13B:
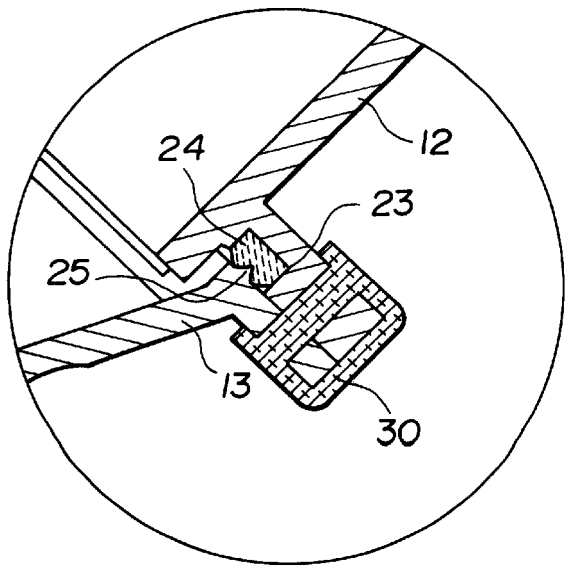
FIG. 13(b) is an enlarged view illustrating a portion P shown in FIG. 13(a)
Figure 13C:
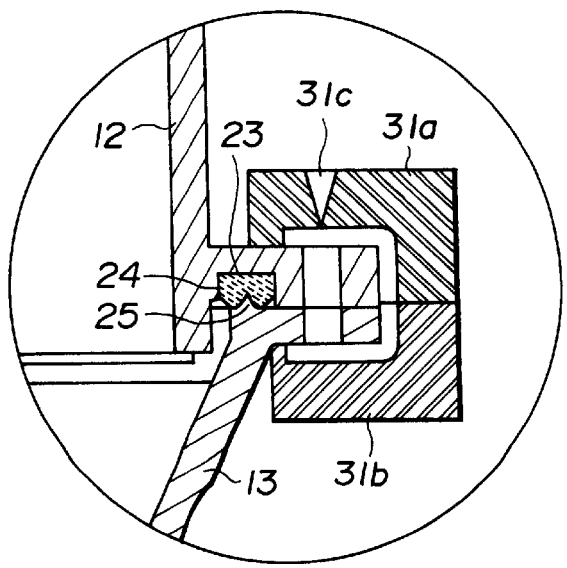
FIG. 13(c) is a diagram illustrating a tool for forming an injected hinge lock member.

The injected hinge lock member 30 shown in FIGS. 13(a) and 13(b) is formed by pouring a resin or the like from an inlet 31c shown in FIG. 13(c) using hinge-lock forming tools 31a and 31b. Thus, the hinge lock members 30 having pins 30a threading through threaded holes 29a and 29b provided in the connecting surfaces of the toner receptacle 12 and the developing frame 13 are formed. The toner receptacle 12 and the developing frame 13 can be connected by the hinge lock members 30. By forming the hinge lock members 30 by injecting resin in the above-described manner, the toner receptacle 12 and the developing frame 13 can be easily connected.

In the above-described configuration, if the melting point of an injected material constituting the hinge lock members 30 is sufficiently low, no chemical influences are given to the toner receptacle 12 and the toner. Hence, when recycling the toner receptacle 12, the toner receptacle 12 and the developing frame 13 can be disassembled by cutting the injected hinge lock members 30. The toner receptacle 12 and the developing frame 13 can be connected again by forming hinge lock members 30 by injecting resin.

Also in this modification, as in the above-described modification, a hinge structure comprising a hinge arm portion and a hinge holder may be provided at one side of the connecting surfaces of the toner receptacle 12 and the developing frame 13 in the longitudinal direction.

Third Embodiment

In the first and second embodiments, a description has been provided of a process cartridge and an image forming apparatus capable of mounting the process cartridge. However, the present invention is not limited to a process cartridge, but may also be applied to a toner cartridge for supplying a toner to an image forming apparatus including an image forming unit, comprising a photosensitive drum, developing means and the like, in the main body of the apparatus.

For example, in a toner cartridge obtained by connecting a first receptacle frame and a second receptacle frame so as to be able to accommodate a toner using configuring connecting means for connecting the first receptacle frame and the second receptacle frame as in the first embodiment, the two frames can be easily disassembled and again connected when collecting and recycling the used toner cartridge. Hence, the toner cartridge can be used again, and therefore the above-described effects of the first embodiment can be obtained.

Other Embodiments

In each of the above-described embodiments, a description has been provided of a case in which the ability to seal the connecting portions between the first receptacle frame and the second receptacle frame, or between the toner receptacle and the developing frame, is increased by providing an elastic seal member is. However, the same effects as in the above-described embodiments also can be obtained by using sealing means other than the elastic seal member, such as an O-ring or the like.

The present invention may be applied not only to the above-described process cartridge B producing a monochromic image, but also to a cartridge including a plurality of developing means for forming an image having a plurality of colors (for example, a two-color image, a three-color image, a full-color image or the like).

As for the developing method, any of various kinds of developing methods, such as a known two-component magnetic-brush developing method, a cascade developing method, a touch-down developing method, a cloud developing method, or the like, may be used.

The photosensitive member is not limited to the above-described photosensitive drum. A photoconductor, such as amorphous silicon, amorphous selenium, zinc oxide, titanium oxide, an organic photoconductor (OPC), or the like, may be used as the photoconductive material. The photoconductive member may be provided in the form of a rotating member, such as a drum, a belt or the like, or a member in the form of a sheet, or the like. In general, a drum-shaped or belt-shaped member is used. For example, a drum-shaped photosensitive member comprising a cylinder made of an aluminum alloy or the like with a photoconductive material coated or deposited in a vacuum thereon may be used.

In the first embodiment, a so-called contact charging method is used for the charging means. However, a conventional configuration, in which a metallic shielding member made of aluminum or the like is provided around a tungsten wire, and positive or negative ions generated by applying a high voltage to the tungsten wire are moved to the surface of a photosensitive drum to uniformly charge the surface of the drum, may of course be used.

As for the charging means, any type other than the above-described roller type, such as a blade type (a charging blade), a pad type, a block type, a rod type, a wire type or the like, may also be used.

As for the method of cleaning toner particles remaining on the photosensitive drum, the cleaning means may comprise a blade, a fur brush, a magnetic brush or the like.

The above-described process cartridge includes an electrophotographic photosensitive member and at least one type of process means. Accordingly, any type of process cartridge other than the above-described type may also be used, such as a cartridge obtained by integrating a photosensitive member and charging means so as to be detachable relative to the main body of the apparatus, a cartridge obtained by integrating a photosensitive member and developing means so as to be detachable relative to the main body of the apparatus, a cartridge obtained by integrating a photosensitive member and cleaning means so as to be detachable relative to the main body of the apparatus, a cartridge obtained by integrating a photosensitive member and at least two of the above-described process means so as to be detachable relative to the main body of the apparatus, or the like.

That is, the above-described process cartridge is obtained by integrating charging means, developing means, or cleaning means and an electrophotographic photosensitive member so as to be detachable relative to the main body of the apparatus, by integrating at least one of charging means, developing means and cleaning means and an electrophotographic photosensitive member so as to be detachable relative to the main body of the apparatus, or by integrating at least developing means and an electrophotographic photosensitive member so as to be detachable relative to the main body of the apparatus.

Although in the above-described embodiments a laser-beam printer is illustrated as the image forming apparatus, the present invention is not limited to such an apparatus. For example, the present invention may, of course, be applied to any other image forming apparatus, such as an electrophotographic copier, a facsimile apparatus, a word processor or the like.

According to the above-described embodiments, the first receptacle frame and the second receptacle frame for accommodating a toner, or the toner receptacle and the developing frame are connected by connection means which can be locally fixed. Hence, even when, for example, the fixing portions have been welded, the two units can be easily disassembled, for example, by cutting the welded portions in a recycling operation. The two disassembled units can be connected again, for example, by welding remaining portions of the connecting surfaces.

By providing a plurality of fixing tabs as the connection means, selectively fixing the fixing tabs, and cutting the fixed tabs in a disassembling operation, and by controlling the remaining number of fixing tabs, the number of recycling operations can be easily controlled.

By fixing the fixing tabs by ultrasonic welding or heat sealing, the two units can be easily connected.

By connecting the fixing tabs by injecting an injection material instead of welding the fixing tabs, the two units can be easily connected.

By providing seal members in connecting portions to be fixed, it is possible to reliably seal the connecting portions, and to completely prevent leakage of toner. By configuring the connecting members with elastic seal members, the seal members can be very easily fitted and removed.

Accordingly, a process cartridge or a toner catridge having the above-described configuration can be easily and efficiently recycled.

As described above, according to the present invention, it is possible to provide a toner cartridge, a process cartridge and an image forming apparatus which can be easily recycled.

The individual components shown in outline in the drawings are all well known in the toner cartridge, process cartridge and image forming apparatus arts and their specific construction and operation are not critical to the operation or the best mode for carrying out the invention.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A process cartridge detachably mountable to a main body of an electrophotographic image forming apparatus, comprising:

an electrophotographic photosensitive member;

process means for acting on said electrophotographic photosensitive member;

a plurality of first engaging members provided at a first frame, each of said plurality of first engaging members having a substantially flat contact surface; and a plurality of second engaging members provided at a second frame, each of said plurality of second engaging members having a substantially flat contact surface, wherein said first frame and said second frame are connected by connecting one or more first engaging members selected from said plurality of first engaging members provided at said first frame and one or more second engaging members selected from said plurality of second engaging members provided at said second frame such that one or more contact surfaces of one or more of said first engaging members, respectively, are adjacent to one or more contact surfaces of one or more of said second engaging members respectively.

2. A process cartridge according to claim 1, wherein said first frame and said second frame constitute a toner receptacle, wherein a plurality of tabs are provided as said plurality of first and second engaging members in a line at said first frame and in a line at said second frame, respectively, and wherein said toner receptacle is configured by connecting one or more tabs selected from said plurality of tabs provided at said first frame and one or more tabs selected from said plurality of tabs provided at said second frame.

3. A process cartridge according to claim 1, wherein said first frame constitutes a toner receptacle, wherein a developing roller is mounted in said second frame, wherein a plurality of tabs are provided as said plurality of first and second engaging members in a line at said first frame and in a line at said second frame, respectively, and wherein said first frame and said second frame are connected by connecting one or more tabs selected from said plurality of tabs provided at said first frame and one or more tabs selected from said plurality of tabs provided at said second frame.

4. A process cartridge according to claim 2 or 3, wherein tabs which have not been selected from said plurality of tabs for one connecting operation are used for connecting said first frame and said second frame in another connecting operation.

5. A process cartridge according to claim 1, wherein said first frame and said second frame constitute a toner receptacle, wherein a plurality of tabs are provided as said plurality of first and second engaging members in a line in said first frame and said second frame, respectively, and wherein said toner receptacle is configured by connecting said two frames with lock members formed by injecting a resin into threaded holes selected from a plurality of threaded holes provided in said first frame and into threaded holes selected from a plurality of threaded holes provided in said second frame.

6. A process cartridge according to claim 1, wherein said first frame constitutes a toner receptacle, wherein a developing roller is mounted in said second frame, wherein a plurality of threaded holes are provided in a line at said first frame and in a line at said second frame, respectively, and wherein said first frame and said second frame are connected with lock members formed by injecting a resin into threaded holes selected from said plurality of threaded holes provided at said first frame and into threaded holes selected from said plurality of threaded holes provided at said second frame.

7. A process cartridge according to claim 1, wherein said plurality of first engaging members provided at said first frame and said plurality of second engaging members provided at said second frame are connected by at least one of bonding using an adhesive, by ultrasonic welding, and by heat sealing.

8. A process cartridge according to claim 1 or 7, wherein said first and said second engaging members, which have been connected, are separable by cutting apart said first and said second engaging members.

9. A process cartridge according to claim 1, wherein said process means comprises cleaning means for removing toner remaining on said electrophotographic photosensitive member.

10. A process cartridge according to claim 1 or 9, wherein said process means comprises charging means for charging said electrophotographic photosensitive member.

11. A process cartridge according to claim 1 or 9, wherein said process means comprises a developing means for developing a latent image formed on said electrophotographic photosensitive member.

12. A process cartridge according to claim 1, wherein said process cartridge comprises a charging means, a developing means and a cleaning means, integrally forming said process means, and said electrophotographic photosensitive member, and is detachably mountable to the main body of the image forming apparatus.

13. A process cartridge according to claim 1, wherein said process cartridge comprises at least one of a charging means, a developing means, and a cleaning means forming process means, and said electrophotographic photosensitive member, and is detachably mountable to the main body of the image forming apparatus.

14. A process cartridge according to claim 1, wherein said process cartridge comprises at least a developing means as said process means, and said electrophotographic photosensitive member, and is detachably mountable to the main body of the image forming apparatus.

15. A process cartridge according to claim 1, wherein said first frame and said second frame constitute a toner receptacle, wherein one or more of said plurality of engaging members provided at said first frame comprise a plurality of tabs provided in a line at said first frame, and wherein one or more of said plurality of engaging members provided at said second frame comprise a plurality of tabs provided in a line at said second frame, wherein the toner receptacle comprises a plurality of tabs provided in a line at said second frame, wherein a number of tabs to be connected in a single connecting operation is less than a total number of tabs provided at each of said first and second frames.

16. A process cartridge according to claim 1, wherein said first frame constitutes a toner receptacle, wherein a developer roller is mounted in said second frame, wherein said plurality of engaging members provided at said first frame comprise a plurality of tabs provided in a line at said first frame, wherein said toner receptacle comprises a plurality of tabs at said first frame connecting to a corresponding number of tabs at said second frame, wherein said corresponding number of tabs to be connected in a single connecting operation is less than a total number of tabs provided at each of said first and second frames.

17. A process cartridge according to claim 1, wherein said first frame and said second frame constitute a toner receptacle, wherein said plurality of engaging members provided at said first frame comprise a plurality of threaded holes provided in a line at said first frame, wherein said plurality of engaging members provided at said second frame comprise a plurality of threaded holes provided in a line at said second frame, wherein said toner receptacle comprises a plurality of lock members formed by injecting a resin into a number of threaded holes at said first frame connected to a corresponding number of threaded holes at said second frame, and wherein the corresponding number of lock members is less than a total number of holes provided at each of said first and second frames.

18. A process cartridge according to claim 1, wherein said first frame constitutes a toner receptacle, wherein a developing roller is mounted in said second frame, wherein said plurality of engaging members provided at said first frame comprise a plurality of threaded holes provided in a line at said first frame, wherein said plurality of engaging members provided at said second frame comprise a plurality of threaded holes provided in a line at said second frame, wherein said toner receptacle comprises a plurality of lock members formed by injecting a resin into a number of threaded holes at said first frame connected to a corresponding number of threaded holes at said second frame, and wherein said corresponding number of lock members is less than a total number of holes provided at each of said first and second frames.

19. A method of assembling a process cartridge detachably mountable to a main body of an electrophotographic image forming apparatus, said method comprising the steps of:
preparing an electrophotographic photosensitive member, a process means for operating on the electrophotographic photosensitive member, a plurality of first engaging members provided at a first frame, each of said plurality of first engaging members having a substantially flat contact surface, and a plurality of second engaging members provided at a second frame, each of said plurality of second engaging members having a substantially flat contact surface; and
assembling said process cartridge by connecting said first frame and said second frame by connecting one or more first engaging members selected from said plurality of first engaging members provided at said first frame and one or more second engaging members selected from said plurality of second engaging members provided at said second frame such that one or more contact surfaces of said one or more first engaging members are adjacent to one or more contact surfaces of one or more of said second engaging members.

20. A method according to claim 19, wherein said first frame and said second frame constitute a toner receptacle, wherein a plurality of tabs are provided as said first and second engaging members in a line at said first frame and said second frame, respectively, and wherein said toner receptacle is configured by connecting one or more tabs selected from said plurality of tabs provided at said first frame and one or more tabs selected from one or more of said plurality of tabs provided at said second frame.

21. A method according to claim 19, wherein said first frame constitutes a toner receptacle, wherein a developing roller is mounted in said second frame, wherein a plurality of tabs are provided in a line at said first frame and in a line at said second frame, respectively, and wherein said first frame and said second frame are connected by connecting one or more tabs selected from said plurality of tabs provided at said first frame and one or more tabs selected from said plurality of tabs provided at said second frame.

22. A method according to claim 20 or 21, wherein certain tabs are selected from said plurality of tabs for connecting said first frame and said second frame in a first connecting operation, and certain other tabs are selected from said plurality of tabs for connecting said first frame and said second frame in another connecting operation.

23. A method according to claim 19, wherein said first frame and said second frame constitute a toner receptacle, wherein a developing roller is mounted in said second frame, wherein a plurality of threaded holes are provided in a line in said first frame and in a line in said second frame, respectively, and wherein said toner receptacle is configured by connecting said two frames by forming lock members by injecting a resin into threaded holes selected from said plurality of threaded holes provided in said first frame and into threaded holes selected from said plurality of threaded holes provided in said second frame.

24. A method according to claim 19, wherein said first frame constitutes a toner receptacle, wherein a developing roller is mounted in said second frame, wherein a plurality of threaded holes are provided in a line in said first frame and in a line in said second frame, respectively, and wherein said first frame and said second frame are connected with lock members formed by injecting a resin into threaded holes selected from said plurality of threaded holes provided in said first frame and into threaded holes selected from said plurality of threaded holes provided in said second frame.

25. A method according to claim 19, wherein one or more of said first engaging members provided at said first frame and one or more of said second engaging members provided at said second frame are connected by at least one of bonding using an adhesive, by ultrasonic welding, and by heat sealing.

26. A method according to claim 19, wherein the process means comprises a cleaning means for removing toner remaining on said electrophotographic photosensitive member.

27. A method according to claim 19 or 26, wherein the process means comprises a charging means for charging said electrophotographic photosensitive member.

28. A method according to claim 19 or 26, wherein the process means comprises a developing means for developing a latent image formed on said electrophotographic photosensitive member.

29. A method according to claim 27, wherein the process means comprises developing means for developing a latent image formed on said electrophotographic photosensitive member.

30. A method according to claim 19, wherein said first frame and said second frame constitute a toner receptacle, wherein said plurality of engaging members provided at said first frame comprise a plurality of tabs provided in a line at said first frame, and wherein said plurality of engaging members provided at said second frame comprise a plurality of tabs provided in a line at said second frame.

31. A method according to claim 19, wherein said first frame constitutes a toner receptacle, wherein a developing roller is mounted in said second frame, wherein said plurality of engaging members provided at said first frame comprise a plurality of tabs provided in a line at said first frame, wherein said plurality of engaging members provided at said second frame comprise a plurality of tabs provided in a line at said second frame, wherein said toner receptacle comprises a plurality of tabs at said first frame connecting to a corresponding number of tabs at said second frame, and wherein said corresponding number of connecting tabs is less than a total number of tabs provided at each of said first and second frames.

32. A method according to claim 19, wherein said first frame and said second frame constitute a toner receptacle, wherein said plurality of engaging members provided at said first frame comprise a plurality of threaded holes provided in a line at said first frame, wherein said plurality of engaging members provided at said second frame comprise a plurality of threaded holes provided in a line at said second frame, wherein said toner receptacle comprises a plurality of lock members formed by injecting a resin into a number of threaded holes at said first frame connected to a corresponding number of threaded holes at said second frame, wherein said corresponding number of lock members is less than a total number of holes provided at each of said first and second frames.

33. A method according to claim 19, wherein said first frame constitutes a toner receptacle, wherein a developing roller is mounted in said second frame, wherein said plurality of engaging members provided at said first frame comprise a plurality of threaded holes provided in a line at said first frame, wherein said plurality of engaging members provided at said second frame comprise a plurality of threaded holes provided in a line at said second frame, wherein said toner receptacle comprises a plurality of lock members formed by injecting a resin into a number of threaded holes at said first frame connected to a corresponding number of threaded holes at said second frame, and wherein said corresponding number of lock members is less than a total number of holes provided at each of said first and second frames.

34. An electrophotographic image forming apparatus, to which a process cartridge is detachably mountable, for forming an image on a recording medium, said apparatus comprising:

an electrophotographic photosensitive member;

process means for operating on said electrophotographic photosensitive member;

a plurality of first engaging members provided at a first frame, each of said plurality of first engaging members having a substantially flat contact surface;

a plurality of second engaging members provided at a second frame, each of said plurality of second engaging members having a substantially flat contact surface;

mounting means for detachably mounting the process cartridge obtained by connecting the first frame and the second frame by connecting one or more first engaging members selected from said plurality of first engaging members provided at the first frame and one or more second engaging members selected from said plurality of second engaging members provided at the second frame such that one or more contact surfaces of one or more of said first engaging members are adjacent to one or more contact surfaces of one or more of said second engaging members;

transfer means for transferring a toner image formed on said electrophotographic photosensitive member included in the process cartridge mounted by said mounting means onto the recording medium; and conveying means for conveying the recording medium.

35. An apparatus according to claim 34, wherein said apparatus comprises a laser-beam printer.

36. An apparatus according to claim 34, wherein said apparatus comprises a facsimile apparatus.

37. An apparatus according to claim 34, wherein said apparatus comprises an electrophotographic copier.

38. A toner cartridge for supplying a toner to a main body of an electrophotographic image forming apparatus, said toner cartridge comprising:

a plurality of first engaging members provided at a first frame, each of said first engaging members having a substantially flat contact surface; and a plurality of second engaging members provided at a second frame, each of said second engaging members having a substantially flat contact surface, wherein a toner receptacle for accommodating the toner is configured by connecting one or more first engaging members selected from said plurality of first engaging members provided at the first frame and one or more second engaging members selected from said plurality of second engaging members provided at the second frame are connected by connecting first engaging members selected from said plurality of first engaging members provided at the first frame and second engaging members selected from said plurality of second engaging members provided at the second frame such that said one or more contact surfaces of one or more of said first engaging members are adjacent to one or more contact surfaces of one or more of said second engaging members, respectively.

39. A toner cartridge according to claim 38, wherein a plurality of tabs are provided as said engaging members in a line at each of said first frame and said second frame, respectively, and wherein said toner receptacle is configured by connecting one or more tabs selected from said plurality of tabs provided at said first frame and one or more tabs selected from said plurality of tabs provided at said second frame.

40. A toner cartridge according to claim 39, wherein certain first and second tabs are selected from said plurality of first and second tabs for connecting said first frame and said second frame in a first connecting operation, and certain other first and second tabs are selected from said plurality of first and second tabs for connecting said first frame and said second frame in another connecting operation.

41. A toner cartridge according to claim 38, wherein a plurality of threaded holes are provided in a line in each of said first frame and said second frame, respectively, and wherein said toner receptacle is configured by connecting said two frames with lock members formed by injecting a resin into threaded holes selected from said plurality of threaded holes provided in said first frame and into threaded holes selected from said plurality of threaded holes provided in said second frame.

42. A toner cartridge according to claim 38, wherein said first engaging members provided at said first frame and said second engaging members provided at said second frame are connected by at least one of bonding using an adhesive, by ultrasonic welding, and by heat sealing.

* * * * *

UNITED STATES PATENT AND TRADEMARK OFFICE
CERTIFICATE OF CORRECTION

PATENT NO. : 6,141,513

DATED : October 31, 2000

INVENTOR(S) : Tsutomu NISHIUWATOKO, et al.

It is certified that error appears in the above-identified patent and that said Letters Patent is hereby corrected as shown below:

COLUMN 6:

Line 47, "reused." should read --and reused.--.

COLUMN 10:

Line 12, "recpetacle" should read --receptacle--.

COLUMN 11:

Line 18, "member is." should read --member.--.

UNITED STATES PATENT AND TRADEMARK OFFICE
CERTIFICATE OF CORRECTION

PATENT NO. : 6,141,513

DATED : October 31, 2000

INVENTOR(S) : Tsutomu NISHIUWATOKO, et al.

It is certified that error appears in the above-identified patent and that said Letters Patent is hereby corrected as shown below:

COLUMN 13:

Line 2, "is" should read --are--.

COLUMN 15:

Line 1, "comprise" should read --comprises--;
Line 10, "comprise" should read --comprises--;
Line 13, "comprise" should read --comprises--;
Line 26, "comprise" should read --comprises--; and
Line 28, "comprise" should read --comprises--.

COLUMN 16:

Line 64, "comprise" should read --comprises--.

UNITED STATES PATENT AND TRADEMARK OFFICE
CERTIFICATE OF CORRECTION

PATENT NO.   :   6,141,513

DATED        :   October 31, 2000

INVENTOR(S)  :   Tsutomu NISHIUWATOKO, et al.          Page 3 of 3

It is certified that error appears in the above-identified patent and that said Letters Patent is hereby corrected as shown below:

COLUMN 17:

Line 3, "comprise" should read --comprises--;
Line 15, "comprise" should read --comprises--;
Line 17, "comprise" should read --comprises--;
Line 30, "comprise" should read --comprises--; and
Line 32, "comprise" should read --comprises--.

Signed and Sealed this

Fifteenth Day of May, 2001

*Attest:*

NICHOLAS P. GODICI

*Attesting Officer*       *Acting Director of the United States Patent and Trademark Office*